US009122131B2

(12) United States Patent
Coppage et al.

(10) Patent No.: US 9,122,131 B2
(45) Date of Patent: Sep. 1, 2015

(54) MICROSCOPE OBSERVATION TUBE SMART-PHONE ADAPTOR

(71) Applicant: IRIDEX Corporation, Mountain View, CA (US)

(72) Inventors: Aaron Coppage, Superior, CO (US); Alexander Fernandez, Mountain View, CA (US)

(73) Assignee: IRIDEX Corporation, Mountain View, CA (US)

( * ) Notice: Subject to any disclaimer, the term of this patent is extended or adjusted under 35 U.S.C. 154(b) by 0 days.

(21) Appl. No.: 14/019,858

(22) Filed: Sep. 6, 2013

(65) Prior Publication Data

US 2014/0362283 A1 Dec. 11, 2014

Related U.S. Application Data

(60) Provisional application No. 61/831,433, filed on Jun. 5, 2013.

(51) Int. Cl.
*H04N 5/225* (2006.01)
*H04N 5/253* (2006.01)
*G03B 23/00* (2006.01)
(Continued)

(52) U.S. Cl.
CPC ............ *G03B 17/561* (2013.01); *G02B 21/362* (2013.01); *H04N 5/2251* (2013.01); *G03B 17/48* (2013.01); *Y10T 29/49826* (2015.01)

(58) Field of Classification Search
CPC ..... G03B 17/48; G03B 17/561; G02B 21/362
USPC ............ 348/373, 79; 396/432; 359/368, 819, 359/827; 455/556.1, 575.1, 575.4
See application file for complete search history.

(56) References Cited

U.S. PATENT DOCUMENTS 4,498,749 A 2/1985 Hoover
4,504,129 A 3/1985 Van Iderstine
(Continued)

OTHER PUBLICATIONS

Notification Of Transmittal Of The International Search Report And The Written Opinion Of The International Searching Authority, Or The Declaration; International Search Report and Written Opinion Of The International Searching Authority for International Application No. PCT/US2014/037528 mailed on Sep. 11, 2014, 10 pages.

*Primary Examiner* — Sinh Tran
*Assistant Examiner* — Mark Monk
(74) *Attorney, Agent, or Firm* — Kilpatrick Townsend and Stockton LLP

(57) ABSTRACT

The present invention generally relates to methods and devices for mounting an image capture device to an optical viewing instrument such as a microscope, telescope, or binocular. More specifically, some embodiments of the present invention relate to an apparatus for mounting a smart phone to an observation tube of microscope. The optical viewing instrument may have an observation tube and an ocular attached thereto. The adapter may include an observation tube ring mount configured to be installed on the observation tube. An observation tube mount may be configured to engage with the installed ring mount. An image capture device holder may be configured to couple with the observation tube mount and configured to receive an image capture device. The image capture device may be a common device such as a smart phone. Optionally, a window may be included in the observation tube mount to facilitate viewing of ocular indicia.

17 Claims, 4 Drawing Sheets

(51) Int. Cl.
  *G02B 7/02* (2006.01)
  *G03B 17/56* (2006.01)
  *G02B 21/36* (2006.01)
  *G03B 17/48* (2006.01)

(56) References Cited

U.S. PATENT DOCUMENTS

| | | | |
|---|---|---|---|
| 6,781,630 | B2 | 8/2004 | Nomura et al. |
| 7,922,402 | B2 | 4/2011 | Gaertner et al. |
| 8,253,787 | B2 | 8/2012 | Yamamoto |
| D682,903 | S | 5/2013 | Bratt |
| 2009/0296210 | A1* | 12/2009 | Schlierbach et al. ......... 359/428 |
| 2010/0142036 | A1* | 6/2010 | Sterns et al. ................. 359/363 |
| 2011/0009163 | A1 | 1/2011 | Fletcher et al. |
| 2012/0050853 | A1 | 3/2012 | Miller et al. |
| 2012/0157160 | A1 | 6/2012 | Ozcan et al. |
| 2013/0016963 | A1 | 1/2013 | Miller |
| 2013/0100271 | A1 | 4/2013 | Howes |
| 2013/0142440 | A1 | 6/2013 | Hirayama et al. |

\* cited by examiner

MICROSCOPE OBSERVATION TUBE SMART-PHONE ADAPTOR

CROSS REFERENCE TO RELATED APPLICATION DATA

The present application claims the benefit of U.S. Provisional Appln. No. 61/831,433 filed Jun. 5, 2013. The full disclosure of which is incorporated herein by reference in its entirety for all purposes.

BACKGROUND

The present invention generally relates to methods and devices for mounting an image capture device to an optical viewing instrument such as a microscope, telescope, or binocular. More specifically, some embodiments of the present invention relate to an apparatus for mounting a smart phone to an observation tube of an optical viewing instrument.

Optical instruments may be used for enhancing images for viewing by a user. For example, telescopes may aid in the observation of remote objects and microscopes may aid in the observation of objects that are too small for observation by the unaided eye. It may be desirable to mount an image capture device to the optical instrument so that the enhanced image may be captured and recorded or transmitted by the image capture device. While some adaptors have been developed, there is a need in the art for more robust adaptors and adaptors with less expensive components.

SUMMARY OF THE INVENTION

The use of microscopes is common within the medical area for viewing of a working area. The use of an observation tube or co-observation tube is especially common for teaching and recording of the primary viewing field. The adaptor device described herein may provide the ability to adapt common devices such as smart phones (including an iPhone™, a Samsung Galaxy™ phone, a Blackberry™ device, or other mobile processor having an image capture device) to an optical viewing instrument's observation/co-observation tubes for image and video capture and transmission.

In some embodiments, an adapter system for mounting an image capture device to an optical viewing instrument is provided. The optical viewing instrument may have an observation tube and an ocular attached thereto. The adapter may include an observation tube ring mount configured to be rigidly installed on the observation tube. An observation tube mount may be configured to engage with the installed ring mount. An image capture device holder may be configured to couple with the observation tube mount and configured to receive an image capture device. The image capture device may be a common device such as a smart phone.

In some embodiments, the observation tube ring mount is configured to be installed on the observation tube distally from the ocular. Optionally the observation tube ring mount is configured to be installed by removing the ocular of the optical viewing instrument, installing the ring mount on the observation tube and then reinstalling the ocular of the optical view instrument after ring mount installation. In some embodiments, the observation tube mount is configured to couple with the ring mount by sliding over the ocular of the optical viewing instrument. Optionally, the observation tube mount includes a viewing window that facilitates viewing of indicia on the ocular. The indicia may include an ocular magnification value and/or other ocular information. Further, in some embodiments, the installed observation tube mount allows for the adjustment of ocular magnification. The observation tube mount may couple with the ring mount using a circumferential clamp mechanism. This may allow for quick and easy connection and disconnection of the system from the ring mount. Optionally, the adapter does not include a lens so as to reduce manufacturing costs.

In some embodiments, a method is provided for modifying an optical viewing instrument so that an image capture device may be mounted to the optical viewing instrument. The optical viewing instrument may have an observation tube and an ocular attached thereto. The method may include installing an observation tube ring mount on the observation tube; securing an observation tube mount over the ring mount; and coupling an image capture device holder with the observation tube mount. Optionally the observation tube ring mount may be installed on the observation tube distally from the ocular. In some embodiments the method further includes removing the ocular of the optical viewing instrument prior to installing the observation tube ring mount on the observation tube and reinstalling the ocular of the optical viewing instrument after installing the observation tube ring mount on the observation tube.

In some embodiments the observation tube mount may be slid over the ocular prior to securing the observation tube mount to the ring mount. Optionally, the observation tube mount includes a viewing window that facilitates the viewing of ocular indicia. In certain embodiments the secured observation tube mount allows for the adjustment of ocular magnification when installed on the optical viewing instrument. In some embodiments the observation tube mount is secured to the ring mount using a circumferential clamp mechanism. Optionally, the modification of the optical viewing instrument does not add, remove, or substitute for a lens.

In certain embodiments, an adaptor system is provided for mounting a smart phone to a microscope. The system may include an observation tube ring mount configured to be installed on the observation tube. The system may also include an observation tube mount having a circumferential clamp and a viewing window. The observation tube mount may be configured to slide over the ocular and engage with the ring mount. The viewing window may be configured to facilitate viewing of ocular indicia. A smart phone holder may be configured to couple with the observation tube mount and configured to receive a smart phone. The smart phone holder may be further configured to align a camera of a received smart phone with an optical axis of the microscope. Certain embodiments of the adaptor system do not include a lens so as to reduce manufacturing costs. In some embodiments, the adaptor system allows for ocular magnification of the microscope to be adjusted when the adaptor system is connected thereto.

In yet another embodiment of the invention, a method is provided for modifying a microscope so that a smart phone may be mounted to the microscope, The method may include the step of removing the ocular of the microscope from the observation tube and installing an observation tube ring mount on the observation tube. Thereafter, the ocular may be reinstalled back to the observation tube. An observation tube mount may be slid over the reinstalled ocular and secured to the ring mount using a circumferential clamp. A smart phone holder may then couple with the secured observation tube mount. Optionally, the observation tube mount may have a viewing window for facilitating view of ocular indicia.

Although exemplary embodiments have been described in detail above, many variations are available. Further features of the invention, its nature and various advantages will be more apparent from the accompanying drawings and the following detailed description.

DETAILED DESCRIPTION OF THE INVENTION

Figure 1A:
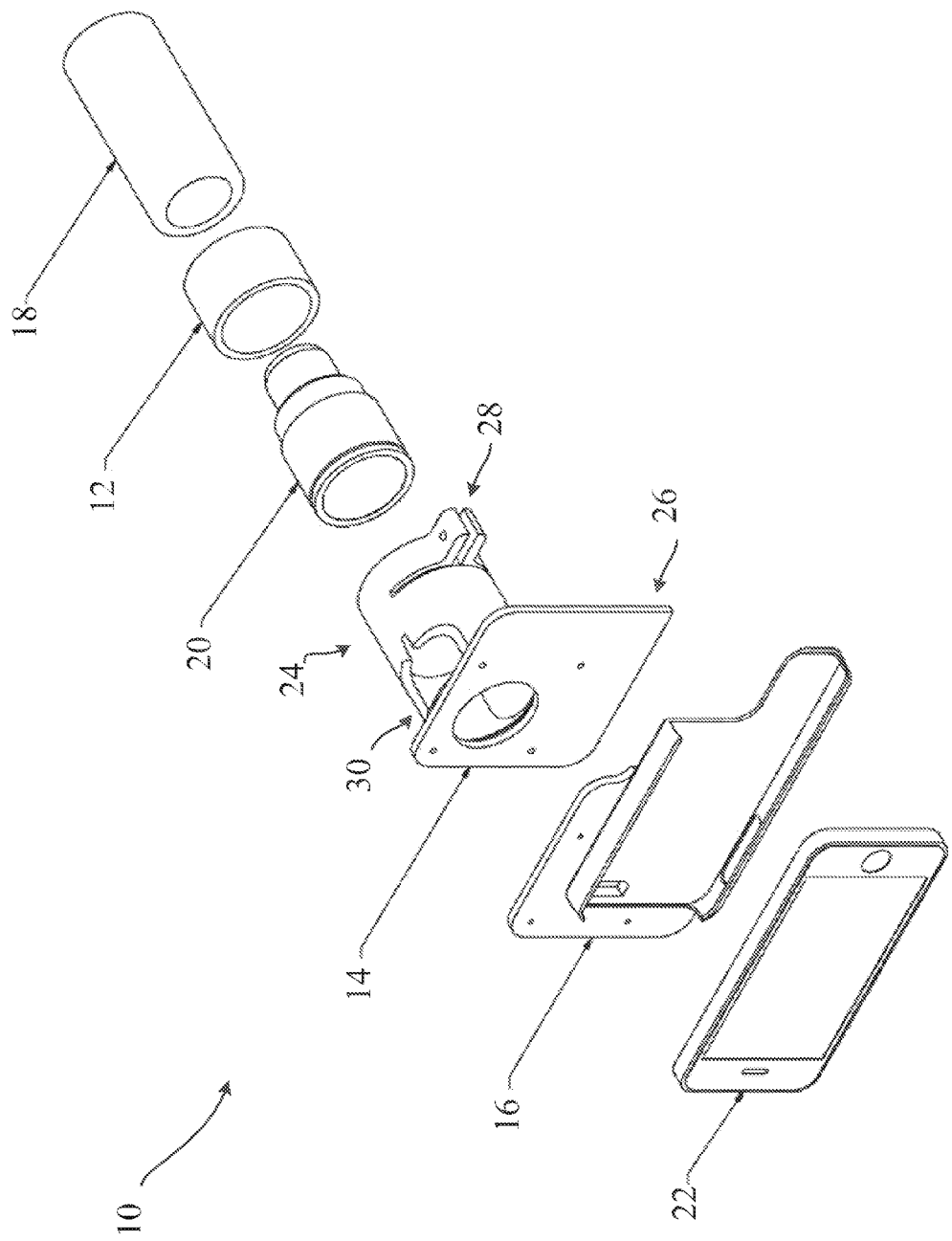
FIGS. 1A-1C are multiple views of an exemplary smart phone microscope observation tube adaptor.
Figure 1B:
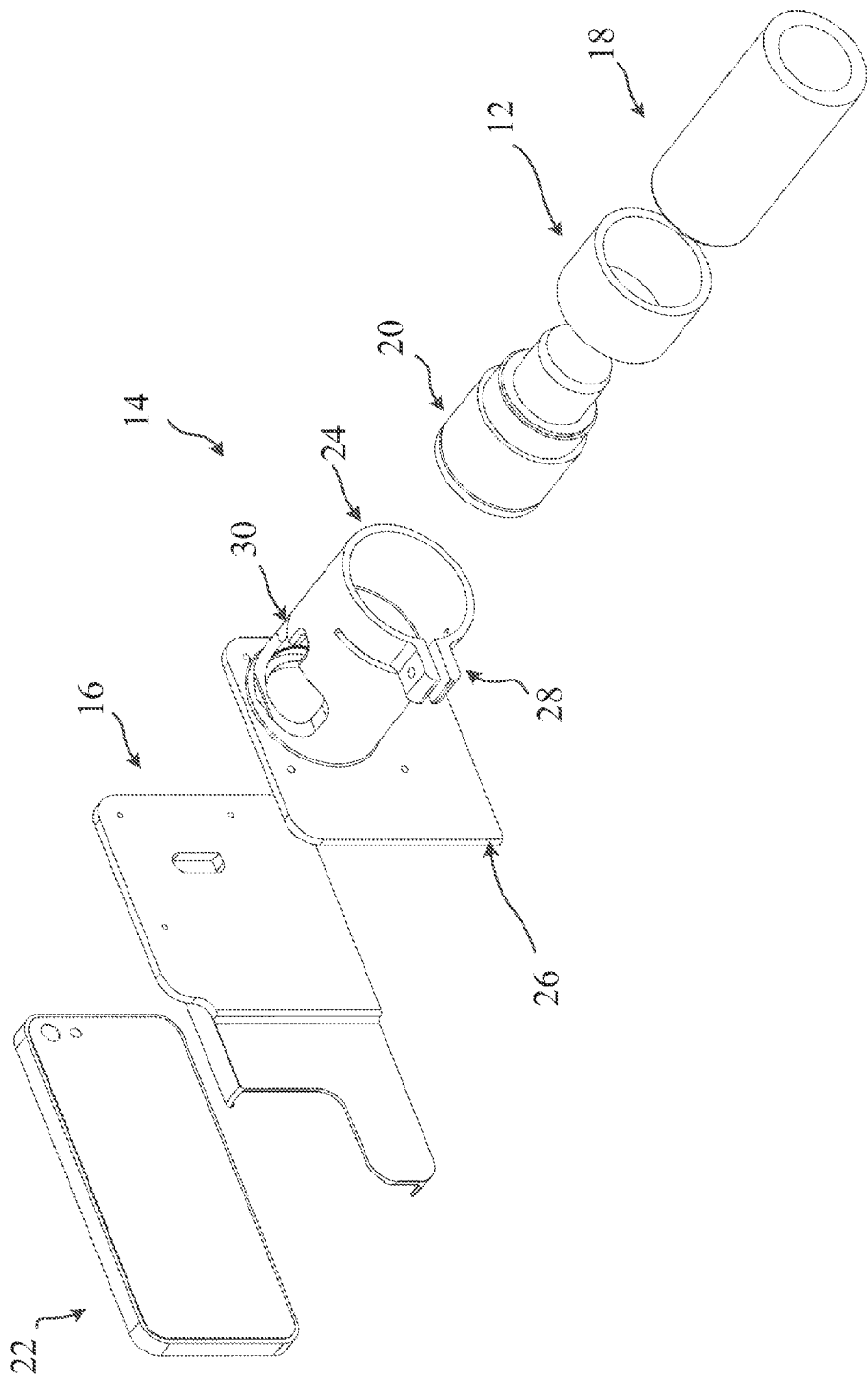
Figure 1C:
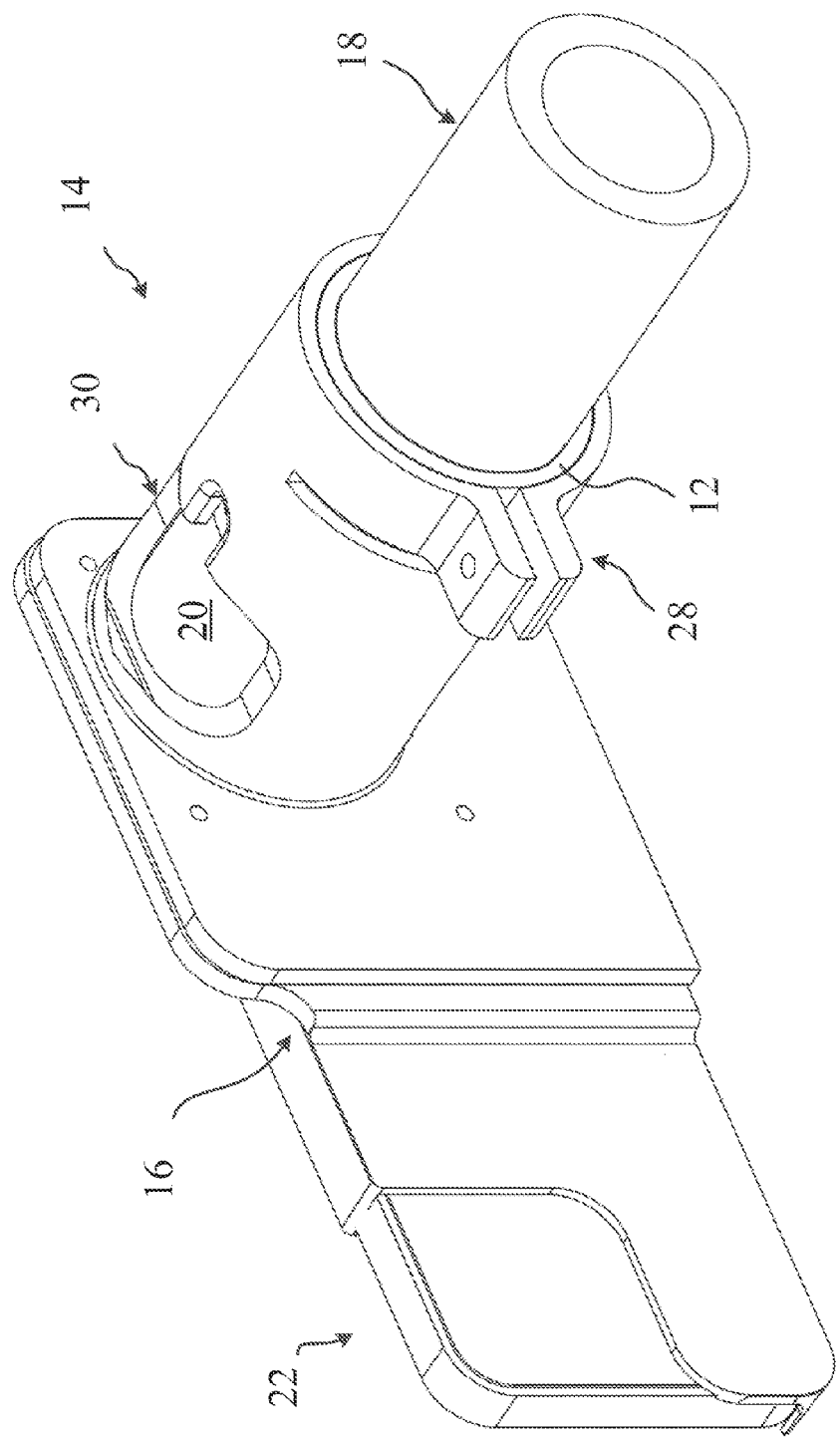

FIGS. 1A-1C are multiple views of an exemplary observation tube adaptor 10. As shown in FIGS. 1A-1C, the exemplary adaptor includes an observation tube ring mount 12, an observation tube mount 14, and an image capture device holder 16. Observation tube 18 and ocular 20 may be components of the microscope. When the exemplary adaptor 10 is installed on the microscope, the image capture device holder 16 may receive an image capture device 22 and align a camera of the device 22 with the optical axis of the microscope. Thereafter, the device 22 may be used to capture, record or transmit images of the microscope viewing field.

Observation tube ring mount 12 may be defined as a ring configured to fit over the observation tube housing 18. Preferably the ring mount 12 is configured to rigidly couple with the observation tube 18 to minimize axial rotation of the installed ring mount 12. In some embodiments the ring mount 12 is dimensioned to fittingly mate with an observation tube housing 18 of a particular manufacturer. For example, a first ring mount may be configured to friction fit with a Carl Zeiss observation tube while a second ring mount may be configured to friction fit with a Haag Streit observation tube. Optionally, ring mount 12 may include an engagement feature for securing ring mount 12 to observation tube 18. For example, a circumferential clamp may be used to secure ring mount 12 to observation tube 18. Hence, ring mount 12 may be configured so as to fit a range of observation tube sizes. Ring mount 12 may include a slit to form a C-shape so as to accommodate a range of observation tube diameters. This feature may allow adaptor 10 to conform to various observation tubes 18. While observation tube ring 12 is illustrated with a cylindrical outer surface, other outer surface configurations are possible. In some embodiments, the outer surface of observation tube ring 12 may include engagement features for coupling with observation tube mount 14. Some embodiments may be splined, grooved or otherwise keyed interface for radial indexing of the observation tube mount 14 to the ring mount 12.

Observation tube mount 14 may include a distal portion 24 and a proximal portion 26. The distal portion 24 may be defined by a portion configured fittingly mate with observation tube ring mount 12. As illustrated in FIG. 1A-1C, exemplary observation tube mount 14 includes generally cylindrical distal portion 24 dimensioned to fit over ring mount 12. Preferably observation tube mount 14 is configured to rigidly couple with the ring mount 12. In some embodiments, observation tube mount 14 includes one or more engagement features for coupling observation tube mount 14 to ring mount 12. For example, a circumferential clamp 28 may be used to secure ring mount 12 to observation tube 18. Other engagement features are possible such as threaded engagement features, dovetail engagement features, cam clamp mechanisms, spline features etc. Preferably the engagement feature will provide for quick and easy connection and disconnection of the adaptor 10, thus allowing a user to readily switch between each configuration.

The proximal portion 26 may be configured to secure image capture device holder 16. The proximal portion 26 may include a front face which corresponds to and may be secured to image capture device holder 16 with one or more engagement features. The image capture device holder 16 may be secured to observation tube mount 14 in a variety of different orientations depending on how the respective engagement features are aligned. This may allow a user to select between a portrait or landscape image/video capture configuration. Preferably, the back side of the proximal portion 26 includes a cylindrical portion for receiving and overlapping ocular 20 so as to limit ambient light leakage.

In some embodiments, observation tube mount 14 may include viewing window 30. Viewing window 30 may facilitate viewing of ocular indicia. The indicia may include the ocular magnification value and/or other ocular info. Preferably, ocular magnification may still be adjusted while observation tube 14 is secured to ring mount 12. This feature may allow a user the ability magnify and focus the optical viewing instrument beyond the ability of an autofocus of the image capture device 22.

As illustrated in FIG. 1A-1C, image capture device holder 16 comprises a phone case and image capture device 22 is a smart phone. In some embodiments, image capture device holder 16 is configured so that image capture device 22 may slide into or snap to the image capture device holder 16. While image capture device holder 16 is configured per a specific smart phone 22, other configurations are possible to correspond with other types of smart phones (e.g., Blackberry™ phones, Samsung™ phones, Apple™ phones, etc.) or devices (e.g., music players, video players, PDA devices, etc., which include an image capture device).

In some embodiments, image capture device holder 16 may be interchanged with other image capture device holders 16 having alternative configurations for receiving other types of image capture devices 22. Accordingly, observation tube mount 14 may have a universal proximal portion 26 for receiving a variety of image capture device holders 16. This feature may provide adaptor 10 the ability to receive and center view various image capture devices 22 to adaptor 10. In some embodiments, adaptor 10 may be independent of observation tube ocular magnification. Preferably, the adaptor does not impede the ability to optimize lighting.

Figure 2:
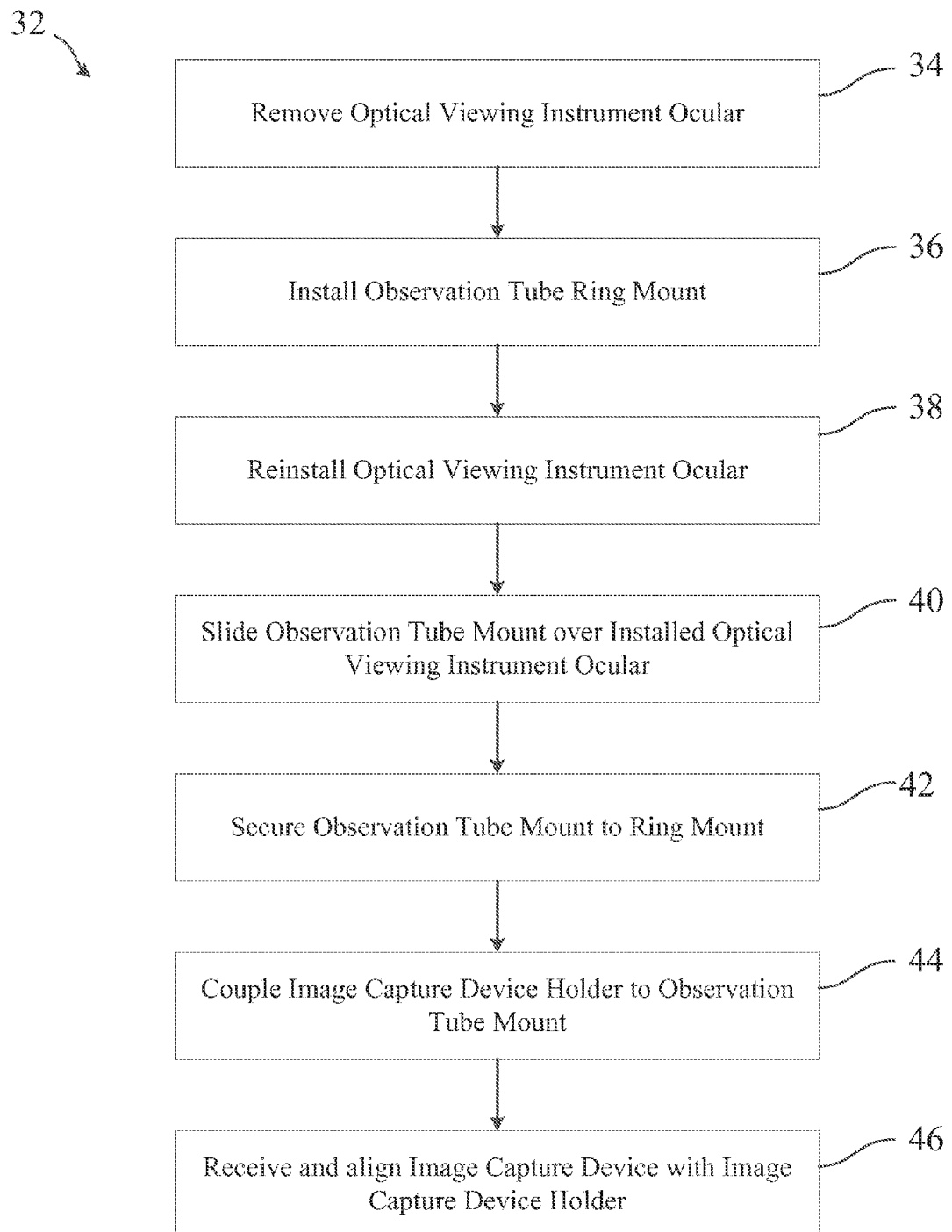
FIG. 2 is an exemplary method of modifying an optical viewing instrument according to some aspects of the present invention.

FIG. 2 is an exemplary method 32 of modifying an optical viewing instrument according to some aspects of the present invention. At step 34, the ocular may be removed from an optical viewing instrument's observation tube. At step 36, a dedicated ring mount may be installed onto the observation tube. At step 38 the ocular is reinstalled in the observation tube housing. At step 40, the observation tube mount slides over the ocular and at step 42, the observation tube mount engages the ring mount. In some embodiments, the observation tube mount may be secured by tightening a clamp mechanism to secure the observation tube mount with the observation tube. At step 44 an image capture device holder may be connected to the observation tube mount. At step 46 an image capture device such as a smart phone may be installed into the holder. Thereafter, photos and video can be captured and transmitted as desired by the operator.

While method 32 illustrated herein may be described as a series of consecutive steps, none of these steps are limited to any particular order. For example, an image capture device may be installed into a respective holder 46 prior to connecting the holder to the observation tube mount 44. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. An adapter system for mounting an image capture device to an optical viewing instrument, the optical viewing instrument having an observation tube and an ocular attached thereto, the adapter comprising:
    an observation tube ring mount having an outer surface opposite an inner surface, the observation tube ring mount configured to be installed on the observation tube by engaging the inner surface of the observation tube ring mount to the observation tube;
    an observation tube mount, separate from the observation tube ring mount, configured to slide over the ocular of the optical viewing instrument installed on the observation tube and to engage with the outer surface of the installed observation tube ring mount; and
    an image capture device holder configured to couple with the observation tube mount and to receive an image capture device.

2. The system of claim 1, wherein the observation tube ring mount is configured to be installed on the observation tube distally from the ocular.

3. The system of claim 2, wherein the observation tube ring mount is configured to be installed by removing the ocular of the optical viewing instrument from the observation tube prior to installation and reinstalling the ocular of the optical view instrument to the observation tube after installation.

4. The system of claim 1, wherein the observation tube mount includes a viewing window that facilitates viewing of ocular indicia.

5. The system of claim 1, wherein the observation tube mount allows for the adjustment of ocular magnification of the ocular after the observation tube mount has slid over the ocular and engaged with the outer surface of the installed observation tube ring mount so as to be installed on the optical viewing instrument.

6. The system of claim 1, wherein the observation tube mount couples with the outer surface of the ring mount using a circumferential clamp mechanism.

7. The system of claim 1, wherein the adapter does not include a lens.

8. A method of modifying an optical viewing instrument so that an image capture device may be mounted to the optical viewing instrument, the optical viewing instrument having an observation tube and an ocular attached thereto, the method comprising:
    installing an observation tube ring mount having an outer surface opposite an inner surface on the observation tube by engaging the inner surface of the observation tube ring mount to the observation tube;
    securing an observation tube mount over the ring mount by sliding the observation tube mount over the ocular of the optical viewing instrument installed on the observation tube and to engage with the outer surface of the installed observation tube ring mount;
    and coupling an image capture device holder with the observation tube mount.

9. The method of claim 8, wherein the observation tube ring mount is installed on the observation tube distally from the ocular of the optical viewing instrument.

10. The method of claim 9, further comprising:
    removing the ocular of the optical viewing instrument prior to installing the observation tube ring mount on the observation tube; and
    reinstalling the ocular of the optical viewing instrument after installing the observation tube ring mount on the observation tube and prior to securing the observation tube mount over the ring mount.

11. The method of claim 8, wherein the observation tube mount includes a viewing window that facilitates the viewing of indicia on the ocular.

12. The method of claim 8, wherein the secured observation tube mount allows for the adjustment of ocular magnification of the ocular after the observation tube mount has slid over the ocular and engaged with the outer surface of the installed observation tube ring mount so as to be installed on the optical viewing instrument.

13. The method of claim 8, wherein the observation tube mount is secured to the ring mount using a circumferential clamp mechanism.

14. The method of claim 8, wherein the modification of the optical viewing system does not add a lens to the optical viewing system.

15. An adaptor system for mounting a smart phone to a microscope, the microscope having an observation tube and an ocular attached thereto, the adapter comprising:
    an observation tube ring mount having an outer surface opposite an inner surface, the observation tube ring mount configured to be installed on the observation tube by engaging the inner surface of the observation tube mount to the observation tube;
    an observation tube mount having a circumferential clamp and a viewing window, the observation tube mount configured to slide over the ocular of the microscope and engage with the outer surface of the installed observation tube ring mount, the viewing window configured to allow for the adjustment of ocular magnification of the ocular after the observation tube mount has slid over the ocular and engaged with the outer surface of the installed observation tube ring mount;
    and a smart phone holder configured to couple with the observation tube mount and to receive the smart phone, the smart phone holder further configured to align a camera of a received smart phone with an optical axis of the microscope.

16. The adaptor system of claim 15, wherein the adaptor system does not include a lens.

17. A method of modifying an microscope so that a smart phone may be mounted to the microscope, the microscope having an observation tube and an ocular attached thereto, the method comprising:
    removing the ocular of the microscope from the observation tube;
    installing an observation tube ring mount on the observation tube;
    reinstalling the ocular back to the observation tube;
    sliding an observation tube mount over the reinstalled ocular;
    securing the observation tube mount over the ring mount using a circumferential clamp; and
    coupling a smart phone holder with the secured observation tube mount, the observation tube mount having a viewing window for facilitating view of ocular indicia.

* * * * *

UNITED STATES PATENT AND TRADEMARK OFFICE
CERTIFICATE OF CORRECTION

PATENT NO. : 9,122,131 B2
APPLICATION NO. : 14/019858
DATED : September 1, 2015
INVENTOR(S) : Aaron Coppage et al.

Page 1 of 1

It is certified that error appears in the above-identified patent and that said Letters Patent is hereby corrected as shown below:

In the claims

Column 6 in Claim 15, lines 28-32 have been amended as follows:
an observation tube ring mount having an outer surface opposite an inner surface, the observation tube ring mount configured to be installed on the observation tube by engaging the inner surface of the observation tube ring mount to the observation tube;

Signed and Sealed this
Third Day of May, 2016

Michelle K. Lee
*Director of the United States Patent and Trademark Office*